(12) United States Patent
Troitski

(10) Patent No.: US 6,664,501 B1
(45) Date of Patent: Dec. 16, 2003

(54) METHOD FOR CREATING LASER-INDUCED COLOR IMAGES WITHIN THREE-DIMENSIONAL TRANSPARENT MEDIA

(75) Inventor: Igor Troitski, 853 Arrowhead Trail, Henderson, NV (US) 89015

(73) Assignee: Igor Troitski, Henderson, NV (US)

( * ) Notice: Subject to any disclaimer, the term of this patent is extended or adjusted under 35 U.S.C. 154(b) by 13 days.

(21) Appl. No.: 10/170,074

(22) Filed: Jun. 13, 2002

(51) Int. Cl.[7] .............................................. B23K 26/00

(52) U.S. Cl. ................................................ 219/121.69

(58) Field of Search ....................... 219/121.61, 121.68, 219/121.69, 121.85, 121.62; 148/525, 565

(56) References Cited

U.S. PATENT DOCUMENTS

| | | | | |
|---|---|---|---|---|
| 2,326,012 A | * | 8/1943 | Dalton | |
| 2,422,472 A | * | 6/1947 | Dalton | |
| 3,715,734 A | * | 2/1973 | Fajans | 340/173 LM |
| 4,092,518 A | * | 5/1978 | Merard | 219/121 LM |
| 4,467,172 A | * | 8/1984 | Ehrenwald et al. | |
| 4,473,424 A | * | 9/1984 | Sorko-Ram | 156/268 |
| 4,744,647 A | * | 5/1988 | Meshel et al. | |
| 4,843,207 A | * | 6/1989 | Urbanek et al. | 219/121.6 |
| 5,206,496 A | * | 4/1993 | Clement et al. | 250/271 |
| 5,268,862 A | * | 12/1993 | Rentzepis | 365/151 |
| 5,575,936 A | * | 11/1996 | Goldfarb | 219/121.68 |
| 5,637,244 A | * | 6/1997 | Erokhin | 219/121.69 |
| 5,653,900 A | * | 8/1997 | Clement et al. | |
| 5,656,186 A | * | 8/1997 | Mourou et al. | 219/121.69 |
| 5,753,877 A | * | 5/1998 | Hartzel et al. | 218/157 |
| 5,786,560 A | * | 7/1998 | Tatah et al. | 219/121.77 |
| 5,886,318 A | * | 3/1999 | Vasiliev et al. | 219/121.69 |
| 6,087,617 A | * | 7/2000 | Troitski et al. | 219/121.6 |

(List continued on next page.)

FOREIGN PATENT DOCUMENTS

| | | | |
|---|---|---|---|
| EP | 0743128 A1 | * | 11/1996 |
| GD | 237 972 A3 | * | 8/1986 |
| JP | 61-288928 | * | 12/1986 |
| JP | 02-183681 | * | 7/1990 |
| JP | 03-120252 | * | 5/1991 |
| RU | 20082288 C1 | * | 2/1994 |
| SU | 321422 | * | 11/1970 |
| SU | 1838163 | * | 3/1992 |
| WO | WO 96/30219 | * | 3/1995 |

OTHER PUBLICATIONS

Troitski, System for creation of laser–induced damage images and problems of their optimization, Proc. of SPIE, vol. 3902 (2000), 489–499.*

Troitski, Experience of Creation of laser–induced damage images, Proc. of SPIE, vol. 3902 (2000), 479–488.*

(List continued on next page.)

*Primary Examiner*—M. Alexandra Elve
*Assistant Examiner*—Jonathan Johnson

(57) ABSTRACT

The present invention discloses a method for the production of laser-induced color images within three-dimensional transparent media, particularly inside the photosensitive glass. The latent image is created by focusing of IK ultra short (from femtosecond to picosecond) laser pulsed radiation into separate areas of the photosensitive glass, so that focal spot sizes are approximately equal to the resolution element of the created image. The latent image develops to the visible image by focusing of laser pulses at points of the latent image, so that focal spots are essentially smaller than the resolution element. During the latent image creation, the laser power is smaller than the breakdown threshold, but has enough value to create the radiation with broad spectrum. During the visible image development, the laser power increases the breakdown threshold, but the breakdown is generated in such a way that the laser-induced damage is practically invisible. The control of color and its intensity is produced during the creation of both the latent and visible images by changing the laser power value and the number of laser pulses focused at the predetermined area.

19 Claims, 2 Drawing Sheets

U.S. PATENT DOCUMENTS

| | | | |
|---|---|---|---|
| 6,322,958 B1 * | 11/2001 | Hayashi | |
| 6,333,485 B1 * | 12/2001 | Haight et al. | 219/121.68 |
| 6,333,486 B1 * | 12/2001 | Troitski | 219/121.69 |
| 6,392,683 B1 * | 5/2002 | Hayashi | |
| 6,399,914 B1 * | 6/2002 | Troitski | |
| 6,417,485 B1 * | 7/2002 | Troitski | |
| 6,426,480 B1 * | 7/2002 | Troitski | |
| 6,490,299 B1 * | 12/2002 | Raevsky et al. | |
| 6,509,548 B1 * | 1/2003 | Troitski | |
| 2003/0015509 A1 * | 1/2003 | Gissinsky et al. | 219/121.85 |

OTHER PUBLICATIONS

Efimov, et al. Photoionization of silicate glasses exposed to IR femtosecond pulses, Journal of non–crystalline solids, vol. 253 (1999) 58–67.*

Troitski, Image recording by laser–induced damages, Optical Memory and Neural Networks, vol. 9, No. 4, 2000.*

Linards Skuja, et al. "Laser–induced color centers in silica" Proc. of SPIE, Vol 4347 (2001) 155–167.*

I.N. Troitski "Method and laser system for creating high-resolution laser–induced damage images" Proc. of SPIE, Vol 4679 (2002) 392–399.*

Kurk Nassau "The physics and chemistry of color" A Wiley–Interscience Publication, 2001, 307.*

Igor Troitski "laser–induced damage creats interior images" OE Reports, No 191, Nov. 1999.*

S.D. Stookey, "Photosensitive glass", Industrial and engineering chemistry, vol. 41, 1949, pp 856–861.*

John E. Ready, "Effects of high–power laser radiation", Academic Press, 1971, pp 279–305.*

A.A. Manenkov "New results on avalanche ionization as a laser damage mechanism in transparent solids," Damage in laser material, 1977, Nat. Bur. Stand. (U.S.) Spec. Publ. 509.*

M.R. Lange, "Temperature dependent effects in laser induced damage," Damage in laser material, 1986, NIST (U>S>) Spec. Publ. 752.*

* cited by examiner

METHOD FOR CREATING LASER-INDUCED COLOR IMAGES WITHIN THREE-DIMENSIONAL TRANSPARENT MEDIA

FIELD OF THE INVENTION

The present invention relates to methods for producing laser-induced color images inside three-dimensional photographic media by using pulsed laser radiation.

BACKGROUND OF THE INVENTION

A number of techniques for creation of colored images inside of transparent substrates by using natural light radiation and for production of laser-induced images created by pulsed laser radiation are well known.

U.S. Pat. No. 2,326,012 to Dalton discloses methods of producing color inside glasses and more particularly methods of making a glass article which includes melting a glass batch containing a reducing agent and a compound of copper, forming the glass into an article, exposing at least a portion of the article to short wave radiations and thereafter heating it for a time and at a temperature sufficient to color the exposed portion red. Another object of this invention is the method of making a glass article, which comprises interposing between a source of short wave radiation and a reduced glass containing copper and tin, a body having regions, which are opaque to the radiations and regions, which are substantially transparent to the radiations, irradiating the glass through the body with the radiations and subsequently heat treating the glass to develop a ruby colored image therein.

U.S. Pat. No. 2,422,472 to Dalton discloses a method creating an article comprising a substantially colorless reduced glass containing an irradiated reduction product of CuO and having within its mass a predetermined, latent, photographic image capable of being developed as a permanent red coloration in a colorless glass body by uniformly hearing the entire glass body.

The Russian invention No. 321422 to Agadjanov et. al. discloses a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethylmethacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

GDR Pat. No. 237 972 A3 to Wiederhold et al. discloses an opaque image pattern imbedded within the inner volume of an otherwise transparent article, without surface damage, using a focused, guided laser with an intensity (power density) at the focal area that exceeds the damage threshold. For instance, to create internal marks in a material having a damage intensity threshold of 40 kW/mm$^2$ which is achievable with an average peak power of 20 kW, a laser with a 2,5 time higher peak power (50 kW) is employed, implying conditions under which ionization is reached.

U.S. Pat. No. 4,467,172 to Ehrenwald et al. discoses the method and apparatus g for laser engraving diamonds with permanent identification markings. A shallow penetration depth and narrow line width is achieved by using a harmonic conversion device to produce an output frequency which is second harmonic of the fundamental laser frequency in combination with a lens system having a short focal length to provide a high density pinpoint spot of laser energy.

U.S. Pat. No. 4,744,647 to Meshel et al. describes semi-opaque cornel contact lens and method of formation. A selected pattern of disruptions in the lens material of a soft or hard corneal contact lens is provided which substantially disrupts the undistorted transmisability of an image to the lens to render it semi-opaque. Preferably, these disruptions are formed by a laser beam, which cause the disruptions. The pattern may be used for coding of lens prescription or the like.

The Japan invention No. 61-288928 to Shigeru Hirukawa disclose the laser beam processing device, which permits partial and satisfactory removal of a resist film on a prescribed substrate or the like by condensing laser light of a CW laser, scanning said light on an object and processing the object while monitoring the processing condition of the object.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

The Japan invention No 02-183681 discloses the marking method for improving the manufacturing yield of a semiconductor device by making the inner part of a transparent base plate selectively opaque and making it as the laser beam irradiates the inner part of the transparent base plate so that the focus is taken on it.

The Japan invention No. 03-120252 to Koji Kuwabara, et al. discloses the marking device and marking method. A laser beam from a UV region laser is swept on a resist by using scanning mirrors, by which the marking is executed.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,268,862 to Rentzepis et al. discloses a method for creating three-dimensional optical memory by two UV laser light beams, typically of 532 nm. and 1064 nm. Wavelength, to change from a first, spiropyran, to a second, merocyanine, stable molecular isomeric form by process of two-photon absorption.

U.S. Pat. No. 5,575,936 to Goldfarb discloses a process and apparatus where a focused laser beam causes local destruction within a solid article, without effecting the surface thereof The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{oo}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a preprogrammed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,653,900 to Clement, et al. discloses a method and an apparatus for making a moving body of material. In a preferred embodiment, the apparatus includes at least one movable galvanometer mirror capable of moving the laser beam to create a mark of a predetermined shape.

U.S. Pat. No. 5,656,186 to Mourou, et al. discloses a method for controlling configuration of laser induced breakdown and ablation. The method comprises generating a beam of laser pulses in which each pulse has a pulse width equal to or less than the predetermined laser pulse width value. The beam is focused to a point at or beneath the surface of a material where laser induced breakdown is desired. The technique can produce features smaller than the spot size and Rayleigh range due to enhanced damage threshold accuracy in the short pulse regime.

U.S. Pat. No. 5,786,560 to Tatah et al. discloses a method of treating a material by generating an ultraviolet wavelength laser beam having femtosecond pulses; splitting the laser beam into a plurality of separate laser beams; directing these laser beams onto a target point within a sample such that the beams overlap to create an intensity sufficient to treat the sample.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. Pat. No. 6,333,485 to Haight, et al. discloses a method for minimizing sample damage during the ablation of material using a focused ultra short pulse beam. The beam is focused above the surface of a material where laser induced breakdown is desired. The region of least confusion (minimum beam waist or average spot size) is above the surface of the material in which laser induced breakdown is desired since the intensity of the beam falls in the forward direction.

U.S. Pat. No. 6,333,486 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski (the application is allowed for issuance as a patent) discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

U.S. Pat. No. 6,399,914 to Troitski discloses methods and an apparatus for creating high quality laser-induced damage images. One or more embodiments of the invention comprise a method for producing laser-induced damage images inside the special transparent material containing special kinds of impurities, which decrease the damage threshold of the material. Colored laser-induced damage images are produced inside transparent materials containing color impurities. Laser radiation is focused inside the transparent material in such a way that focal area contains at least one said impurity. Other embodiments of the invention comprise a method and a system for producing laser-induced images by using two lasers. The first laser generates radiation, which heats the predetermined material area about a point, where breakdown should be produced, to the vitrify temperature. The second laser generates radiation, which creates breakdown in a point of the heated area after the area is heated to the vitrify temperature.

U.S. Pat. No. 6,322,958 to Hayashi discloses a marking method using a laser beam and laser marking apparatus for forming a marker in a transparent member. The laser beam is converged at the points of the material to form cracks, which have shape long in a direction perpendicular to an optical axis of the laser beam.

U.S. Pat. No. 6,322,958 to Hayashi discloses a method for making marks in a transparent material by using a laser. A mark is formed in the region of the object to be marked where the laser beam is focused. Generation of dirt caused by marking, rupturing of the object to be marked, and the like, can be prevented.

U.S. patent application Ser. No. 09/651,076 to Troitski (the application is allowed for issuance as a patent) discloses the method and laser system for production of high quality single-layer laser-induced damage portraits inside transparent material.

U.S. patent application Ser. No. 10/117,592 to Troitski et al. discloses the method for producing images containing laser-induced color centers and laser-induced damages. These color centers are produced in a result of photoionization generated by laser radiation with energy lower the breakdown threshold.

The publication "New results on avalanche ionization as a laser damage mechanism in transparent solids" to A. Manenkov describes theoretical and experimental investigations of the interaction of laser radiation with transparent material.

The publication "Effects of high-power laser radiation" to John Ready describes effects accompanying creation laser-induced damages.

The publication "Temperature dependent effects in laser induced damage" to M. Lange at al. describes the temperature dependence of various process can be extremely important in laser induced damage mechanisms.

The experiments described in a publication entitled "Photoionization of silicate glasses exposed to IR femtosecond pulses" (O. M. Efimov et al., Journal of Non-Crystalline Solids 253 (1999), 58–67) show that photoionization of silicate glasses is possible under infrared (IR) high-power femtosecond (about 100 fs) pulses, and color centers are generated by laser pulses at irradiance below the thresholds of laser-induced damage and catastrophic self-focusing.

The publication "System for creation of laser-induced damage images and problems of their optimization" (I. N. Troitski, Proc. of SPIE Vol. 3902 (2000), 489–499) describes methods for generating 3D images and portraits allowing reproduction of them within an optically transparent material with the same resolution like computer images, without sharp point structure and without significant fluctuation of gray shades.

The publication "Experience of creation of laser-induced damage images" (I. N. Troitski, Proc. of SPIE Vol. 3902 (2000), 479–488) discloses the specific system for production of laser-induced damage images.

The publication "Image recording by laser-induced damages" (I. N. Troitski, Optical Memory and Neural Networks, Vol. 9, No. 4, (2000) 233–238) discusses the problems of laser-induced damage utilization for image recording.

The publication "Laser-induced color centers in silica" (Linards Skuja,et al., SPIE Volume 4347 (2000) 155–167) reviews the color centers contributing to the optical absorption spectrum of synthetic silica glass in the near infrared—to vacuum UV range. The optical properties of common impurities/dopants in synthetic silicas used in laser optics are discussed.

The publication "Method and laser system for creating high-resolution laser-induced damage images" (I. N. Troitski, Proc. of SPIE Vol. 4679 (2002), 392–399) describes creation of small laser-induced damages without large star structure by the specific temporal radiation.

SUMMARY OF THE INVENTION

The present invention has its principal task to provide a method for the production of laser-induced color images within three-dimensional transparent media, and more particularly, inside the photosensitive glass.

One or more embodiments of the invention comprise a method for creation of a latent image inside the photosensitive glass by focusing IK ultra short (from femtosecond to picosecond) laser pulsed radiation into separate areas of the created image, so that focal spot sizes are approximately equal to the sizes of the resolution element of the created image. During the latent image creation, the laser power is lower the breakdown threshold, but has enough value to create the radiation with broad spectrum.

One or more embodiments of the invention comprise a method for development of the latent image to the visible image by focusing of the laser pulses at the points of the latent image, so that focal spots are essentially smaller than the resolution element. During the visible image development, the laser power increases the breakdown threshold, and the breakdown is generated so way that the laser-induced damage is practically invisible.

One or more embodiments of the invention comprise a method, in which the control of color and its intensity is produced during creation both the latent and visible images by changing the laser power value and the number of the laser pulses focused at the predetermined area.

One or more embodiments of the invention comprise a method wherein the breakdown plasma generates the ultraviolet light, which creates the latent image; the breakdown plasma is created by series of laser pulses focused at many points of the image area, so that the first pulse generates the plasma, which is maintained by the following pulses.

One or more embodiments of the invention comprise a method wherein a color image inside the photosensitive glass is produced by creating the latent image, focusing pulsed laser radiation for generating of the ultraviolet radiation, and by developing the visible color image, using ordinary heat treatment of whole photosensitive glass.

One or more embodiments of the invention comprise a method wherein a color image inside the photosensitive glass is produced by the irradiation of the photosensitive glass using standard ultraviolet radiation and by development of the visual image using controlling heat treatment basing on the focusing laser pulsed radiation and generation of laser-induced breakdowns at the focusing points.

DETAILED DESCRIPTION OF THE INVENTION

Figure 1:
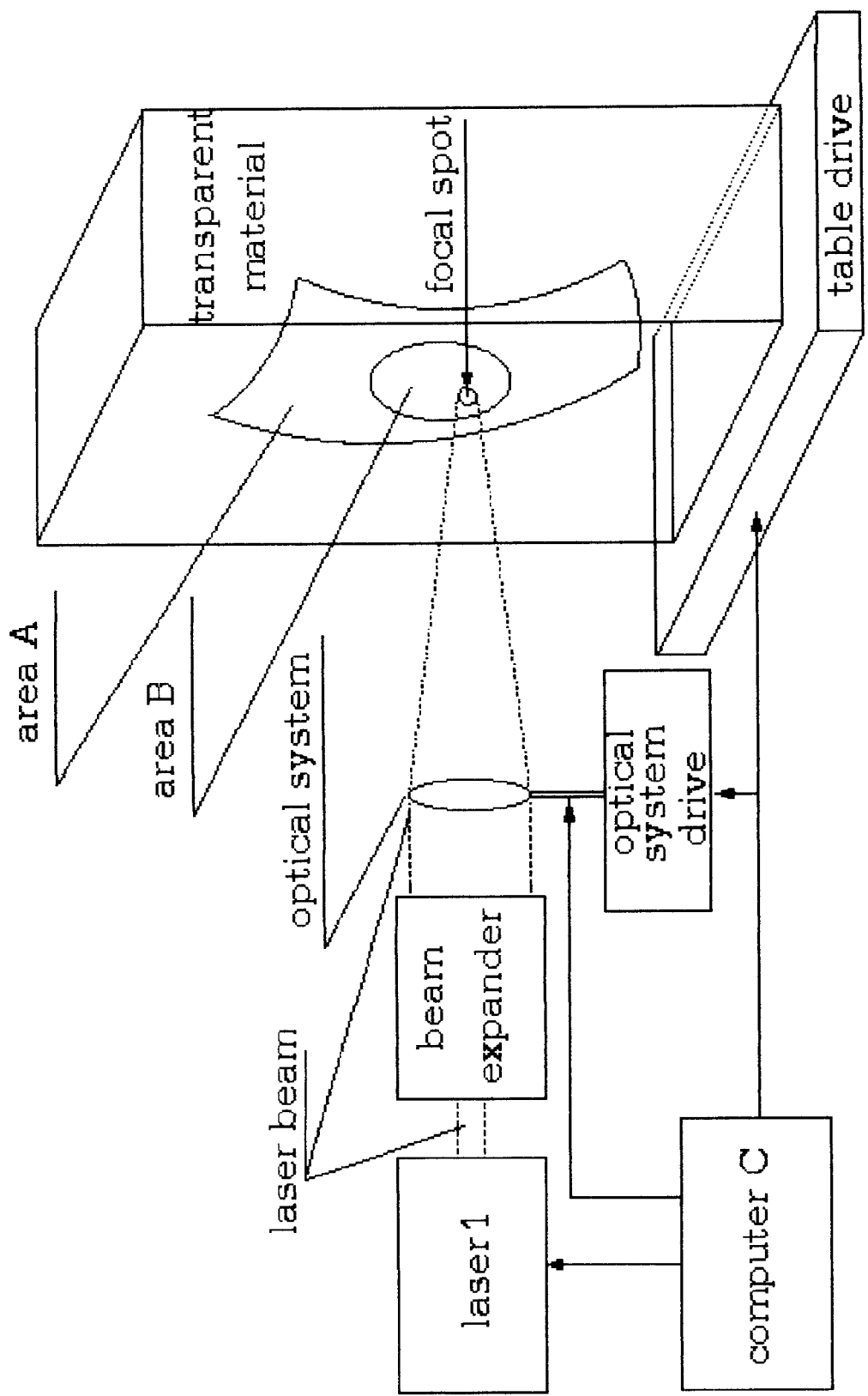
FIG. 1 shows in block-diagram form a laser system for the creation of the latent image: laser 1 generates pulsed laser beam; the beam expander broadens the beam; the optical system focuses the beam at the predetermined point of the transparent material; area A and area B put together the created image; the optical system drive and the table drive jointly remove the focal position of the laser beam at the predetermined point; computer C controls the devices, the laser, and the focusing optical system.

The invention comprises the method for production of laser-induced color images inside optically transparent materials. In general, the invention relates to methods, in which laser energy is utilized to generate laser-induced color images, using peculiar characteristics of photosensitive materials and the physical phenomenon of the interaction of power pulsed laser radiation with the transparent material.

Development of methods creating colored laser-induced images is the urgent problem of the laser-induced image technology (see Igor Troitski "Laser-induced damage creates interior images" OE Report, No 191, November 1999). It is possible to formulate at least three different ways, which can give the decision of the problem:

1) creation of laser-induced images by using color centers generated on the base of the photosensitive effect;
2) creation of laser-induced color images by using laser-induced damages of the special space shapes;
3) creation of laser-induced images inside the transparent materials possessing of peculiar characteristics.

As it was mentioned above, U.S. patent application Ser. No. 10/117,592 to I. Troitski et al. discloses the method for producing laser-induced color images by the first way. These images contain laser-induced color centers produced in a result of the photoionization generated by laser radiation with energy lower the breakdown threshold. The second way was used in U.S. patent application Ser. No. 10/016,013 to I. Troitski. This Patent Application discloses the method for production of laser-induced damage images with special characteristics (in particularly, color images) by creating damages of special space shape.

The present invention uses the third way and discloses the methods creating laser-induced color images within three-dimensional photographic glasses.

There are several types of glasses, which can be used to print colored photographic images within glass articles. One of the three-dimensional photographic media, which makes it possible, is photosensitive glass (see S. D. Stookey, "Photosensitive glass", Industrial and Engineering Chemistry" Vol. 41, 1949, pp 856–861 and Kurt Nassau "The physics and chemistry of color", A Wiley-Interscience Publication, 2001, pp 307–308). To provide a better understanding of the using the photosensitive glasses for creation of images consisting color areas inside transparent materials, it is expedient first to consider the special characteristics of photosensitive glasses and special processes, which attend the printing of colored photographic images within photosensitive glasses.

Photosensitive glasses are very similar to certain conventional glasses in composition, except for minute additions of constitution that may be classified as photosensitive metals, optical sensitizers and thermoreducing agents.

Two basic types of photosensitive glasses exist: photosensitive metal-colored glasses, and photosensitive opal glasses.

The image of photosensitive metal-colored glass is a color transparency consisting of submicroscopic metal particles (the more important photosensitive metals are gold, silver, and copper).

The image of photosensitive opal glass is made up of microscopic nonmetallic crystals capable of diffusing light.

Photosensitive glasses use two types of optical sensitizers: the first type of sensitizer comprises certain members of the polyvalent group (for example, compounds of tin or antimony, which decrease the ultraviolet exposure required to produce a latent image, but to reduce the contrast of the developed image); the second type of the sensitizer (for example, cerium salt) permits to absorb new wave lengths.

The photographic process consists of two steps: exposure with ultraviolet light, and development by heat treatment.

The whole process can be carried out in ordinary room light, and no chemicals are required.

Photosensitive glasses are exposed by ultraviolet light through conventional photographic negatives.

The color of the image depends on the exposure time: at the beginning a blue coloration appears; still more exposure causes a shift in the band of low transmittance, or absorption peak, toward shorter wave lengths, so that the visible color changes from blue through purple, ruby, and amber; this shift of the absorption peak leads to an actual decrease of visual color density as the exposure is increased beyond a certain point, because the low transmittance band moves out of the range of maximum eye sensitivity; for this reason, the ruby and amber colors appear less intense than the blue and purple obtained with less exposure.

The depth to which the image penetrates into the glass is a function of both of exposure time and of the wave lengths of effective radiation employed (for example if only wave lengths below 315 m$\mu$ are employed, the image is confined to a relatively shallow surface layer; if, at the other extreme, all radiation of wave lengths shorter than 340 m$\mu$ is eliminated, a uniform color is produced throughout a deep section of glass, ranging up to a maximum of 2 inches).

Development of the latent image to a visible photograph is accomplished by appropriate heat treatment.

Intensity of the developed color is progressively increased with temperature; the maximum developing temperatures are limited in practice by deformation of the glass above the softening temperature.

The colors produced by strong exposure are developed more rapidly than those with less exposure.

Under low gold concentration, high temperature of the glass during exposure and high temperature rate during development make worse color images.

The destruction of the latent image at high temperatures is accompanied by thermoluminescence.

The developed image in nearly all cases consists of colors identical with those of typical gold ruby, cooper ruby, or silver yellow glasses.

The sizes of the metal particles are in general too small to produce appreciable light scattering, and it appears possible that in certain cases they may be atomically dispersed.

Photosensitive opal glasses use the photographically developed particles of gold, copper, or silver as nuclei for formation and growth of various types of crystals within the glass. In most cases the crystals are transparent and colorless (except for the color imparted by the metal), but different in refractive index from the glass; in the case the image is a light-diffusing white design within the clear glass.

The processes accompanying printing color images inside photosensitive glasses have been described for the natural light. In this case, although color images are created inside three-dimensional media, they are not really 3D images and give only in some cases a stereoscopic illusion.

Let us imagine, how this process can be modified in order to create really three-dimensional color images inside the photosensitive glasses. First of all, it is necessary to refuse from the use of the photographic negatives and to form the latent image as really 3D image but not as a projection of the photographic negative. In the second place, since the ultraviolet light passes through the thick glass badly, but we wish to create a color image inside the thick glass, it is necessary to use the radiation, for which a glass is really the transparent material, and to create such conditions, that this radiation generates required ultraviolet radiation inside required area of the glass. In the third place, since the color of the area of the photosensitive glass depends on the exposure time, it is necessary for creation of the image with different colors to change the exposure time or radiation intensity according to the required color of the image areas. In the forth place, the intensity of the color image development could be increased essentially, if we will create the separate small heating areas inside the photosensitive glass (indeed, in this case the maximum developing temperature of these areas are not limited by deformation of the glass above the softening temperature), and additionally, controlling the temperature of this separate areas, it is possible to create the image areas with different color intensity.

Creation of color images by laser radiation inside the photosensitive glasses gives a chance to realize all effects mentioned above and to produce really three-dimensional color images using all space of the 3D media. To explain, how the laser radiation can be used for production of 3D laser-induced color images we should formulate the general physical regularities accompanying interaction of power pulsed laser radiation with the transparent material.

The transmission of the laser beam through the transparent material are generally highly power dependent (see John F. Ready "Effects of High-Power Laser Radiation" Academic Press, 1971, pp 279–305). While the laser power is below a certain value, the beam passes through the transparent material with no apparent effect. For distinctness, we will discuss the transmission of ultra short infrared (IR) high-power pulsed laser radiation.

The experiments show that:

when laser power of ultra short (from femtosecond to picosecond) pulses runs up the certain value, which is however bellow the breakdown threshold, the radiation spectrum is broadened so it contains ultraviolet light with wavelengths up to 230 nm;

the radiation with broad spectrum causes the photoionization and, as a result of this phenomenon, the color centers are generated;

when laser power exceeds the breakdown threshold, a plasma condition is generated and the shock wave, associated with the plasma, causes a cleavage in the transparent material;

when the duration of the laser pulse decreases, the shock wave become less and the laser-induced damage decreases, so it is possible to create very small cleavages, which are invisible with the naked eye;

when the plasma is generated in a spot of the transparent material, the temperature of the place is increased to a value of several thousands of degrees;

the plasma of the laser-induced breakdown generates the broad spectrum radiation, including the ultraviolet waves.

Comparing to the processes of color images printing inside photosensitive media with the process of the laser beam interaction with the transparent material, we can make following conclusions:

using IR ultra short laser pulses and focusing them in series at the predetermined points (areas) of the photosensitive glasses, it is possible to generate around these points (inside the areas) the ultraviolet radiation and in this way to create a latent image;

since the photosensitive glass is transparent for IR radiation (in contrast to the ultraviolet radiation) and since IR ultra short pulses generate the ultraviolet only, when the IR radiation power increases certain value, it is possible, focusing IR radiation at the predetermined points, to create the latent image at any depth of the glass;

since the plasma generated by the breakdown has very high temperature it is possible, creating the breakdowns at the predetermined points of the glass, to develop the color image;

focusing laser radiation and generating high temperature at the separate points it is possible to create temperature higher deformation of glass and in this way to increase the intensity of the developed color essentially;

since the sizes of laser-induced damages depend on parameters of laser pulses, the breakdowns can be used both for development of color image (without creation of visible damages) and for production of visible damages, which can be also used for creation of the image;

color centers, generated by photoionization, create (in this case) a noise image, which disappears during the heat treatment accompanying the development of the color image.

The following examples illustrate the utilization of the pulsed laser radiation for realization of processes, accompanying the creation of the latent image and the development of the latent image to the visible image.

EXAMPLE 1

Let us assume that we should create a latent image by ultraviolet irradiation of the predetermined glass area. For this, we can focus the ultra shot laser pulses at the area. The shape of the focal area, in which the value of the laser power increases a certain value, determines the shape of irradiated area. Controlling the parameters of the optical system, it is possible to control the shape of the irradiated area. Controlling the laser power, it is possible to control the value of ultraviolet radiation. However, the last way has the limitation: it is not desirable, that the laser power will increase the breakdown threshold. Therefore if the radiation value should be increased it is possible to focus several pulses at the same area.

One or more embodiments of the invention comprise a method producing the ultraviolet irradiation needed for creation of the latent image by focusing infrared ultra short (from femtosecond to picosecond) laser pulses, the power of which is lower the breakdown threshold but is enough larger to create the broad specter radiation, containing ultraviolet waves.

One or more embodiments of the invention comprise a method, in which the required shape of the area, irradiated by ultraviolet radiation, is formed by the focusing optical system.

One or more embodiments of the invention comprise a method generating the variety of potential colors of the latent image by controlling of the power values of the laser pulses focused at the image area.

One or more embodiments of the invention comprise a method wherein the different potential colors of the latent image are controlled by the number of the laser pulses focused at the same resolution element.

One or more embodiments of the invention comprise a method wherein the focal area, in which the broaden radiation is generated, equals (approximately) to the latent image area corresponding to one resolution element.

FIG. 1 illustrates in block-diagram form a laser system used for creation of the latent image of 3D surface having two different color areas: area A is blue, and area B is read. The laser 1 is the pulsed laser, the beam of which is capable to create the radiation with broad spectrum inside the focal area. Its power can be controlled so as the value of radiation inside area B is higher than area A. Once emitted from the laser 1, the pulsed beam is focused at the predetermined point of transparent material, so that the focal spot is equal (approximately) to the resolution element of the created image. The distances between the focal spots are also equal (approximately) to the linear resolution element. The optical system drive and the table drive jointly remove the focal position of the laser beam at the predetermined point of the transparent material. Computer C controls the devices, the parameters of laser, and the focusing optical system.

EXAMPLE 2

Let us assume that we should develop the visible image from the latent image created in Example 1 and so that color contrast of the area B is higher than the area A. For development of the latent image to the visible image with different contrast of different areas it is necessary to heat these areas for different temperatures. The heat treatment can be produced by focusing power pulsed laser radiation at points of latent image area so as breakdowns are generated at these points. The breakdown plasma has the high temperature and it heats the nearby area very fast. In result of the breakdown, a laser-induced damage arises. The damage looks like white area of the created image. When white areas are needed for formation the image, then the damages can be used both for creation of the white areas and for development of the color image. Sometimes, the white areas are not desirable and in these cases the laser-induced damages should be invisible by the naked eye. Such invisible laser-induced damages can be created by ultra short laser pulses (for example, IR femtosecond and picosecond pulses), focused at very small point, which are invisible by naked eye. The heat treatment control (and hence, the control of colors and color intensity of the created image) by generating of the laser-induced damages can be made by changing the energy value of laser beam. Moreover, the control can be produced by variation of density points, in which the breakdowns are generated. More number of points creates higher temperature of nearby area. Therefore for creation higher contrast of area B, the point density of area B should be larger than area A. However, in general case, the distances between these points should be larger than certain value $d_0$. If distances between several points become smaller than $d_0$ then crash is happened and the damage becomes visible. In a result we have limitation of controlling different color contrast by variation of points density. This limitation can be removed, if together with density control to use repetition of focusing laser radiation at points located between previous points (repeated focusing laser pulses at the same points can create visible damage).

One or more embodiments of the invention comprise a method wherein controlling heat treatment attending the development of the latent image to the visible color image is made by focusing laser pulses, the power of which equals (or larger) to the breakdown threshold.

One or more embodiments of the invention comprise a method wherein the creation of different colors with different intensity of the developed visible image is produced by generating the breakdown at small points, which are invisible by naked eye.

One or more embodiments of the invention comprise a method wherein the laser-induced breakdowns, used for controlling heat treatment, are generated so way that the laser-induced damages, occurred in a result of the breakdowns, are practically invisible by the naked eye.

One or more embodiments of the invention comprise a method wherein invisible by naked eye laser-induced breakdowns, used for controlling heat treatment, are generated by ultra short laser pulses.

One or more embodiments of the invention comprise a method wherein the creation of different colors with different intensity of the developed visible image is produced by generating the breakdown at points covered the areas with different density.

One or more embodiments of the invention comprise a method wherein a different colors and color intensities of the developed image are generated by the controlling of the number of the laser pulses focused at the same area.

One or more embodiments of the invention comprise a method wherein repeated pulses at the same area are focused at points, which are located between the previous points.

One or more embodiments of the invention comprise a method forming white areas inside the color images by creation of visible laser-induced damages, which at the same time are used for color image development.

Figure 2:
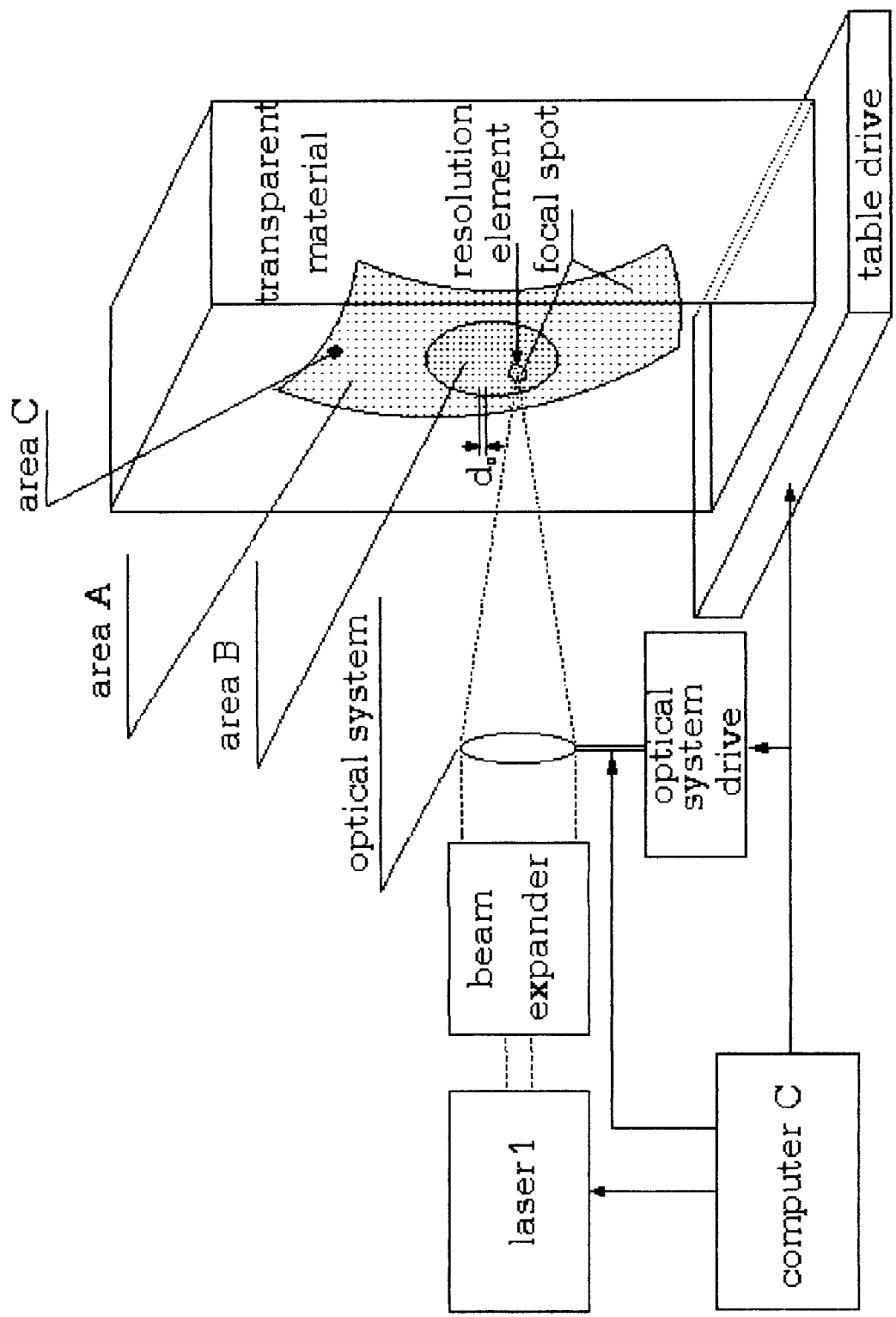
FIG. 2 shows in block-diagram form a laser system for the development of the latent image to the visible image. The system comprises: laser 1; the beam expander; the focusing optical system; the optical system drive; the table drive and computer C. Area A and area B are covered by points, in which the laser-induced breakdowns should be generated; $d_0$ is the minimum distance between the points; area C is the laser-induced damage area.

FIG. 2 illustrates in block-diagram form the same laser system (see FIG. 1), which now is used for development of the latent image to the visible image with different contrasts and colors of areas A and B. The laser 1 is also the pulsed laser, but its beam is capable to create laser-induced breakdowns inside focal areas. Now focal spots are essentially smaller than during the creation of the latent images and the distances between them are not less than $d_0$. The breakdowns density of area B is higher than area A. The area C has high density points, so that distance between separate points is smaller $d_0$. In a result the area looks like a laser-induced damage and can be used as the white point of the created image.

The method for producing images inside photosensitive glasses by using laser radiation comprises the following steps:

Step 1: determination of optical resolution (sizes of the resolution element), which should be realized for the image reproduced inside the transparent material;

Step 2: transformation of the computer image into arrangement of areas, corresponding to the separate resolution elements;

Step 3: determination (for each of said areas) of the values of the laser radiation required for creation of the right colors of the latent image areas;

Step 4: determination (for each of said areas) the number of laser pulses, required for creation of the right colors of the latent image areas;

Step 5: adjustment of the focusing optical system so as the focal spot coincides with the resolution element of the reproduced image;

Step 6: generation of the ultra short laser pulses and focusing them at the predetermined points in accordance with the pulse power determined above;

Step 7: refocusing the optical system so as it focuses the laser radiation at the small points;

Step 8: transformation of the computer image into arrangement of areas, which can differ from the resolution elements, but these areas have the identical colors;

Step 9: definition (for each of the said areas) of the number of points, at which laser radiation should be focused to generate breakdowns for controlling heat treatment of the latent image;

Step 10: definition of the arrangement of the said points for the development of the right colors of the created image without undesirable visible damage;

Step 11: determination of the number of laser pulses, which should be focused at the each area of the latent image to develop the visible image area with required color intensity and contrast;

Step 12: generation of the ultra sort laser pulses and creation of the breakdowns at the predetermined points, by using the sharp focusing optical system.

The method disclosed above creates the latent image using ultraviolet light, generated by IR laser, the power of which is lower the breakdown threshold. Another way is to use the ultraviolet light generated by the breakdown plasma. Since the breakdowns, which give invisible damages, generate the small value of the ultraviolet radiation, it is necessary in this case, to use a laser with high pulse repetition frequency and to create the breakdowns at many centers of the image area, maintaining the radiation generated previous breakdowns. Using the laser-induced breakdowns and arranging them at the image area in accordance with required density, it is possible to produce the creation of the latent image and development of the latent image to the visible color image practically at once, one after another.

One or more embodiments of the invention comprise a method wherein the breakdown plasma generates the ultraviolet light, which creates the latent image; the breakdown plasma is created by series of laser pulses focused at many points of the image area, so that the first pulse generates the plasma, which is maintained by the following pulses.

One or more embodiments of the invention comprise a method wherein the creation of the latent image and development of the latent image to the visible color image are produced practically at once one after another by using both the broad spectrum radiation and the heat generated by the laser-induced breakdowns.

The methods disclosed above utilize the laser radiation both for creation of the latent image and for the development of the visual color image. However, it is possible to produce 3D color image inside the photosensitive glass using laser radiation only for exposure or development. It is clear, that if in a result of using laser radiation, the created latent image has potential high quality (i.e. high ultraviolet irradiation of all resolution elements) then it is possible to develop the visual color image by the regular way, heating whole photosensitive glass. Another case, whole photosensitive glass is irradiated by ultraviolet light but development of the visual color image is produced by controlling heat treatment using the breakdowns created by short laser pulses. In both these situations, the demands to parameters of laser radiation and of the focusing optical system rise.

One or more embodiments of the invention comprise a method producing 3D color images by creating the latent image using laser radiation and by developing the visual image, using ordinary heat treatment.

One or more embodiments of the invention comprise a method producing 3D color images by irradiating the photosensitive glass using standard ultraviolet radiation and by developing the visual image using controlling heat treatment basing on the laser-induced breakdowns.

I claim:

1. A method for the production of laser-induced color images within three-dimensional photosensitive transparent media comprising:

transformation of the computer image into the arrangement of areas, which consist of separate resolution elements having the same color and contrast;

creation of a latent image inside the photosensitive glass by focusing laser radiation into the separate areas, each of which corresponds to the resolution element of the created image, so that the areas are irradiated by the ultraviolet radiation, the value of which can be controlled for each resolution element, not depending on its location depth;

development of the latent image to the visible color image by individual heat treatment of each separate area, corresponding to the resolution element of the created color image.

2. The method in accordance with claim 1 wherein the ultraviolet irradiation needed for creation of the latent image is generated by focusing infrared ultra short (from femtosecond to picosecond) laser pulses, the power of which is lower the breakdown threshold but is larger to create the broad specter radiation inside the focal area.

3. The method in accordance with claim 1 wherein the required shape of the area irradiated by ultraviolet radiation is formed by the focusing optical system.

4. The method in accordance with claim 1 wherein the variety of potential colors of the latent image is generated by controlling of the power values of the laser pulses focused at the image area.

5. The method in accordance with claim 1 wherein the different potential colors and color intensities of the latent image are controlled by the number of the laser pulses focused at the same resolution element.

6. The method in accordance with claim 1 wherein the focal area, in which the broaden radiation is generated, equals (approximately) to the latent image area corresponding to one resolution element.

7. The method in accordance with claim 1 wherein controlling heat treatment attending the development of the latent image to the visible color image is made by focusing laser pulses, the power of which equals (or larger) to the breakdown threshold.

8. The method in accordance with claim 7 wherein the creation of different colors with different intensity of the developed visible image is produced by generating the breakdown at points covered the areas with different density.

9. The method in accordance with claim 8 wherein the said laser-induced breakdowns, used for controlling heat treatment, are generated so way that the laser-induced damages, occurred in a result of the breakdowns, are practically invisible by the naked eye.

10. The method in accordance with claim 9 wherein the said laser-induced breakdowns are generated by ultra short laser pulses.

11. The method in accordance with claim 7 wherein a different colors and color intensities of the developed image are generated by the controlling of the number of the laser pulses focused at the same area.

12. The method in accordance with claim 1 wherein forming white areas inside the color image is produced by creation of the visible laser-induced damages, which at the same time are used for color image development.

13. The method in accordance with claim 11 wherein repeated pulses at the same area are focused at points, which are located between the previous points.

14. The method, in accordance with claim 1, for creation of a latent image inside the photosensitive glass comprising the steps of:

determination of the sizes of the photosensitive glass areas corresponding to the resolution elements, which should be realized in the created image;

transformation of the computer image into arrangement of areas, corresponding to the said separate resolution elements;

determination (for each of the said areas) of the value of the laser radiation required for creation of the required potential colors of the latent image areas;

determination (for each of the said areas) of the number of laser pulses required for generation of the required color;

adjustment of the focusing optical system so as its focal spot coincides with the resolution element of the reproduced image;

generation of the ultra short laser pulses and focusing them at the predetermined points in accordance with the pulse power determined above.

15. The method, in accordance with claim 1, for development of the latent image to the visible color image comprising the steps of:

refocusing the optical system so as it focuses the laser beam at the points which are essentially smaller than the resolution element;

transformation of the computer image into arrangement of areas, which can differ from the resolution elements, but the said areas have the identical colors;

definition (for each of the said areas) of the number of points, at which laser radiation should be focused to generate breakdowns for controlling heat treatment of the latent image;

definition of the arrangement of the said points for the development of the right colors of the created image without undesirable visible damage;

determination of the number of laser pulses focused at the each said area to develop visible image with required color intensity and contrast.

16. The method in accordance with claim 1 wherein the breakdown plasma generates the ultraviolet light, which creates the latent image; the said breakdown plasma is created by series of laser pulses focused at many points of the image area, so that the first pulse generates the plasma, which is maintained by the following pulses.

17. The method in accordance with claim 1 wherein the creation of the latent image and development of the latent image to the visible color image are produced practically at once one after another by using both the broad spectrum radiation and the heat generated by the laser-induced breakdowns.

18. The method wherein a color image inside the photosensitive glass is produced by creating the latent image, focusing pulsed laser radiation for generating of the ultraviolet radiation, and by developing the visible color image, using ordinary heat treatment of whole photosensitive glass.

19. The method wherein a color image inside the photosensitive glass is produced by the irradiation of the photosensitive glass using standard ultraviolet radiation and by development of the visual image using controlling heat treatment basing on the focusing laser pulsed radiation and generation of laser-induced breakdowns at the focusing points.

* * * * *